United States Patent [19]
Walker et al.

[11] Patent Number: 5,970,478
[45] Date of Patent: Oct. 19, 1999

[54] METHOD, APPARATUS, AND PROGRAM FOR CUSTOMIZING CREDIT ACCOUNTS

[75] Inventors: Jay S. Walker, Ridgefield; James A. Jorasch, Stamford, both of Conn.

[73] Assignee: Walker Asset Management Limited Partnership, Stamford, Conn.

[21] Appl. No.: 08/815,224

[22] Filed: Mar. 12, 1997

[51] Int. Cl.[6] .................................................. G06F 17/00
[52] U.S. Cl. .............................. 705/35; 705/38; 705/39
[58] Field of Search .................................. 705/1, 20, 26, 705/30, 34, 35, 38, 39; 345/326, 327, 329, 335, 352; 395/200.33, 200.47, 200.49

[56] References Cited

U.S. PATENT DOCUMENTS

| | | | |
|---|---|---|---|
| 4,724,521 | 2/1988 | Carron et al. | 395/712 |
| 4,774,664 | 9/1988 | Campbell et al. | 364/408 |
| 5,297,026 | 3/1994 | Hoffman | 364/408 |
| 5,477,040 | 12/1995 | Lalonde | 235/380 |
| 5,513,250 | 4/1996 | McAllister | 379/91 |
| 5,663,757 | 9/1997 | Morales | 348/13 |

OTHER PUBLICATIONS

Money, Jun. 1992, vol. 21, n 6, p. 39(2), Beth Kobliner, "How to Get Better Deals on Loans and Credit Cards".
Money, Sep. 1994, vol. 23, n 9, p. 80(3), Vanessa O'Connell, "When it Pays to Wrestle With Your Banker".
Sacramento Bee, Jul. 28, 1996, "Lay Your Cards On The Table", Nancy Lloyd, p. D1.
The Houston Chronicle, Dec. 26, 1995, "Consumers lose their way in blizzard of credit card offers", Debra Fowler, p. Business 1.
Pittsburgh Post–Gazette, Feb. 4, 1996, "Card sharks", Patricia Sabatini, p. C1.
Winston–Salem Journal, Feb. 8, 1995, "Credit card features a fixed interest rate", Mark Dillon, p. C8.
Credit Card Management, Jan. 1996, vol. 8, No. 10, p. 13, "Risk–based repricing draws flak".
Federal Reserve Bulletin, Sep. 1992, vol. 78, No. 9, p. 652, "Developments in the pricing of credit card services", G.B. Canner et al.
U.P.I., Feb.5, 1992, "American Express launches new Optima card strategy", Paul Deckelman.
Los Angeles Times, Oct. 18, 1996, "Consumer Checklist/ Kathy M. Kristof; Free Round of Talks at the Bar", Kathy M. Kristof, part D, p. 3.
Business Wire, Apr. 9, 1996, "Howard I. Atkins named chief financial officer of New York Life Insurance".
Orange County Metropolitan, Dec. 15, 1994, "The Irvine solution", Jim Callahan, Sec. 1, p. 44.
The Independent, Sep. 29, 1996, "No big deal from the Pru", Steve Lodge, p. 17.
The San Diego Union–Tribune, May 8, 1988, "Pre–approved plastic provides punch for purchasing a home", Marsha Kay Seff, p. F–22.
Cards International, n 151, p. 9, Mar. 12, 1996, "Concentrating on quality".
Plain Dealer, p. 4D, Sep. 30, 1996, "Keybank USA card rates lower for fast bill payers".
American Banker, v CLXI, 187, p. 8, Sep. 30, 1996, "Key Corp Card: Higher Payments Mean Lower Rates".
Debit Card News, v 1, n 21, p 1+, Apr. 29, 1996, "A New Debit Day Dawns For Department Stores".

(List continued on next page.)

*Primary Examiner*—Thomas Peeso
*Attorney, Agent, or Firm*—Fitzpatrick, Cella, Harper & Scinto; Jeffrey L. Brandt

[57] ABSTRACT

An apparatus, method, and program for customizing credit accounts and calculating an appropriate price for this customization. Customers with existing credit accounts and customers applying for new accounts can customize various parameters of their accounts, in exchange for a fee to be collected by the credit issuer. The fee may depend on the particular set of parameters selected by the customer.

48 Claims, 7 Drawing Sheets

OTHER PUBLICATIONS

Providence Journal–Bulletin, p N/A, Apr. 10, 1996, "Two Rhode Islands banks offer credit with a philanthropic twist".

National Underwriter Property & Casualty, Jul. 8, 1996, p. 1, "Regulators Move To Curtail Two Progressive Practices".

National Underwriter Property & Casualty, Jun. 17, 1996, p. 6, "Tech Firms Look To Secure Internet–Based Transactions".

Cards International, n 163, p. 12, Sep. 17, 1996, "Big potential in a small market".

Asset–Backed Securities Week, v 2, n 32, p 1+, Aug. 5, 1996, "U.S. Issuers Invade British Credit Card Market".

Credit Card Management, v 9, n 3, p. 92+, Jun. 1996, "Here Come The Yankees".

Retail Banker International, n 347, p. 9, Apr. 24, 1996, "UK banks are 'a bunch of clowns'".

Cards International, n 148, p. 11, Jan. 30, 1996, "Preparing for the smart revolution: Part One".

Bank Technology News, v 8, n 12, p. 11, Dec. 1995, "Trust Co. Leapfrogs Into Lending On The Internet".

Cards International, n 143, p. 3, Nov. 9, 1995, "United Kingdom: Two banks launch Gold Visa cards".

Cards International, n 143, p. 2, Nov. 9, 1995, "Malaysia: Arab Bank launches first credit card".

METHOD, APPARATUS, AND PROGRAM FOR CUSTOMIZING CREDIT ACCOUNTS

BACKGROUND OF THE INVENTION

The present invention relates generally to the field of credit accounts. More specifically, it relates to a method, apparatus, and program for modifying the terms of existing credit accounts and customizing the terms of new credit accounts to meet specific customer needs.

Credit accounts are widely used throughout the world for non-cash payments for goods and services. Typically, the authorized user of the account is issued a card and account number that can be used to charge purchases to his account. The credit card issuer (e.g., a bank) pays the merchant, and the card holder then pays the card issuer. The issuer's revenues are received by charging the merchant a fee for each transaction, and charging the card holder periodic fees and interest on unpaid balances.

From the card issuer's perspective, issuing credit cards can be a very profitable business. A good customer can generate hundreds of dollars of revenue per year. As a result, card issuers want to keep as many of their customers as they can. This is especially true for their best customers. Card issuers also want to attract new customers, in the hopes of generating additional revenue.

Credit card issuers have traditionally tried to attract new customers by advertising in banks and places of business, and by sending offers to potential customers by mail. The terms (or parameters) of these offers vary. For example, various credit card accounts offer different combinations of interest rates, credit limits, and annual fees. Many of these offers promise the customer a low introductory interest rate for a relatively short period of time, such as six months. Other offers promise rewards for card usage such as rebates on products (e.g., GENERAL MOTORS), cash rebates (e.g., DISCOVER), or frequent flyer miles (e.g., AMERICAN AIRLINES/CITIBANK). Until now, credit card issuers have typically relied on this relatively limited range of product differentiation in combination with traditional advertising to distinguish their accounts from competitor's offerings. To the best of our knowledge, credit card issuers have never tried to attract new customers by offering customizable accounts, in which the customer is free to choose the terms of the account, as a means to distinguish their product from the competition.

Perhaps more importantly, credit card issuers have never offered customizable accounts to retain existing customers that are about to switch to a competitor's card. In fact, until now, no effective way has been devised for a credit card issuer to retain an existing customer who is about to switch to a competitor's card.

The existing mechanisms for retaining customers are very limited. In certain cases, banks have been known to waive an annual fee at the request of a card holder, or even reduce the interest rate of an account. But these cases are relatively rare, and there are no automated mechanisms known to us for determining when and how to make an adjustment to the account terms in order to retain a customer.

In addition to the problems faced by the credit card issuers, customers (i.e., the card holders) face a separate set of problems. Customers with good credit histories often receive numerous offerings to sign up for new credit cards. But while customers are free to seek out an account with terms that they desire, customers have always been faced with a yes/no decision for each account—there is no way to specify the exact parameters desired. The customers' freedom to change the terms of existing accounts is even more severely limited, as described above. In fact, under the existing system, it is impossible for certain customers to obtain all of the account terms that they desire.

While a customer can obtain new terms by switching to a new account, this can cause inconvenience in a number of ways.

First, the customer is inconvenienced by applying for the new account and closing the old account. Second, the customer is inconvenienced because he must switch any automatic payments that he has authorized (e.g., payment of his utility bill) to the new account. Third, if the card holder neglects to switch an automatic payment, he may be inconvenienced or embarrassed by interrupted service or delivery of an item that he expects to receive. Further, because the terms of the new account are predetermined, the customer may not be happy even after he has switched to a new account. The new account may not have the type of credit terms that he wants.

For customers with bad credit, the situation is even worse. While customers with good credit histories are able to switch to new accounts, customers with poor credit histories may be unable to qualify for the standard terms of any credit card issuer. As a result, the customer is unable to open a new account, and is forced to continue with the terms of his existing accounts. Worse yet, customers with weak financial credentials may be unable to qualify for any credit card. This can have significant drawbacks when trying to obtain goods or services typically available only with the use of a credit card, such as renting a car. Not having a credit card can also preclude many forms of commerce now widely practiced, such as ordering merchandise by telephone. Indeed, the desirability of having credit cards will only increase with the growth of commerce over the Internet, a medium in which physical exchanges of currency are not possible.

SUMMARY OF THE INVENTION

One aspect of the invention is a data processing apparatus for pricing a credit account having at least one customer-specified credit parameter. This apparatus includes a CPU and a memory containing a program, to be executed by the CPU, for receiving the credit parameters and calculating a price for a corresponding credit account.

Another aspect of the invention is a method of pricing a credit account having at least one specified credit parameter. The method includes the steps of receiving the credit parameters, calculating a price for a corresponding credit account, and outputting the price.

Other aspects of the invention include a computer program and an apparatus corresponding to the method described above, and an embodiment using a central controller and a number of agent terminals. Additional aspects of the invention are directed to the central controller and the agent terminal individually.

The invention provides numerous advantages to both credit card issuers and credit card holders, by providing a method, apparatus, and program for customizing the terms of credit accounts, for both new and existing customers.

The invention benefits credit card issuers because it enables them to attract new customers by offering customized credit card accounts that meet the customer's needs. It may even be used to attract new customers that might not be able to qualify for credit cards with more traditional terms. For example, a card issuer may be willing to issue a credit card with a low credit limit and a high annual fee to people with poor credit histories.

The invention also benefits credit card issuers by enabling them to retain existing customers and reduce account attrition. If a customer calls to cancel his account, the card issuer may be able to rewrite the terms of the customer's existing account and thereby entice him to stay.

The invention also benefits credit card issuers by providing them with an opportunity to charge a fee for changing the terms of a customer's account.

By enabling the card issuers to attract new customers and retain existing customers, the invention can provide the card issuer with more opportunities to make a profit. This is particularly important when the invention is used to retain customers that generate large profits for the card issuer.

The invention benefits credit card holders by enabling them to find a card with credit terms that they desire, and to modify those terms as their needs change. For example, the invention can be used by a card holder who is worried about rising interest rates to lock in a fixed interest rate for a given period of time.

The invention also benefits credit card holders by eliminating the problems, described above, of switching to a new card to obtain credit terms that they need.

Further advantages and features of the invention will be apparent to those skilled in the art upon an examination of the following detailed description of preferred embodiments taken in conjunction with the accompanying drawings.

DETAILED DESCRIPTION OF THE PREFERRED EMBODIMENTS

Figure 1:
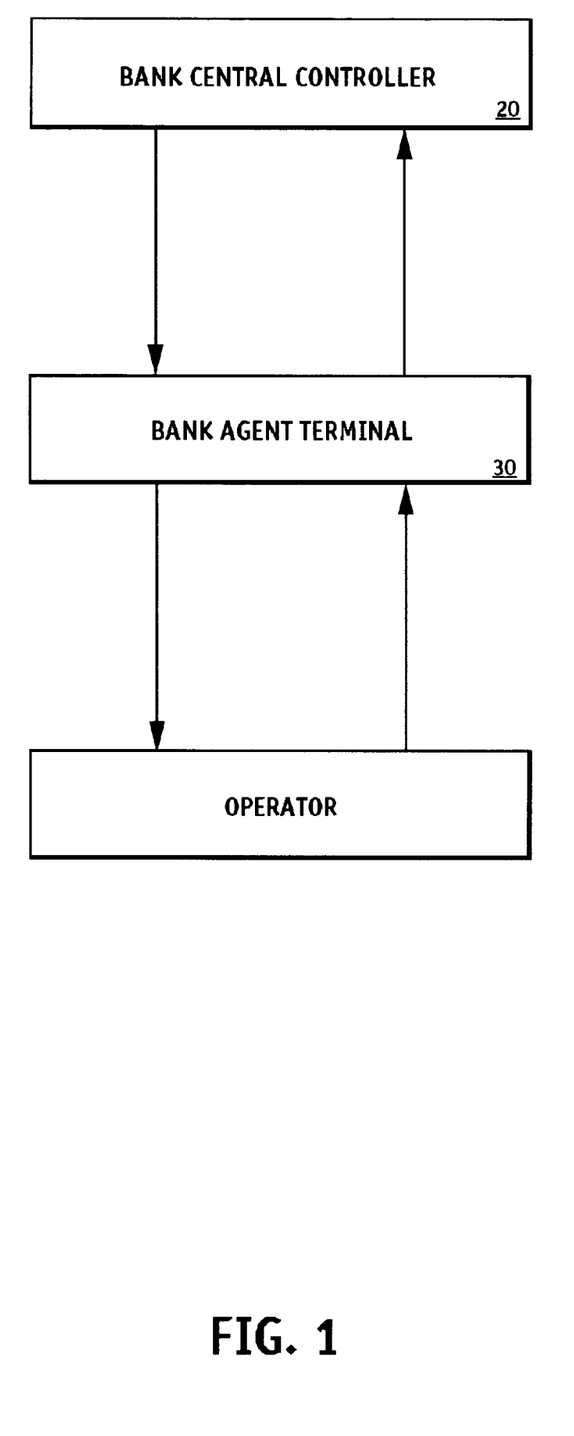
FIG. 1 is an overall system block diagram of a preferred embodiment of the present invention.

FIG. 1 depicts the flow of information for customizing a pre-existing credit card account in accordance with the present invention. In this embodiment, a bank central controller 20 is linked to at least one bank agent terminal 30. Although a single agent terminal is depicted in FIG. 1, any number of agent terminals can be used. The link between each agent terminal 30 and the central controller 20 need not be a physical link—each can, for example, be linked via a modem, as described below, or any other appropriate communications channel. A transaction can be initiated from any one of the agent terminals 30. The information required to implement the transaction is passed between the agent terminal 30 and the central controller 20, until the transaction is complete.

The system depicted in FIG. 1 may be embodied in hardware specifically provided to implement the present invention. Alternatively, the system may be implemented using hardware and infrastructure that may already exist to link terminals in banks (or other locations) to a central controller being used for other purposes. Existing central controllers may be modified to incorporate the present invention in various ways, such as by adding an additional file server (with or without a CPU dedicated to credit card customizing transactions). Alternatively, the present invention may be implemented using existing hardware entirely, by making appropriate software updates at an existing central controller and existing agent terminals, in accordance with the present invention as taught below.

Figure 2:
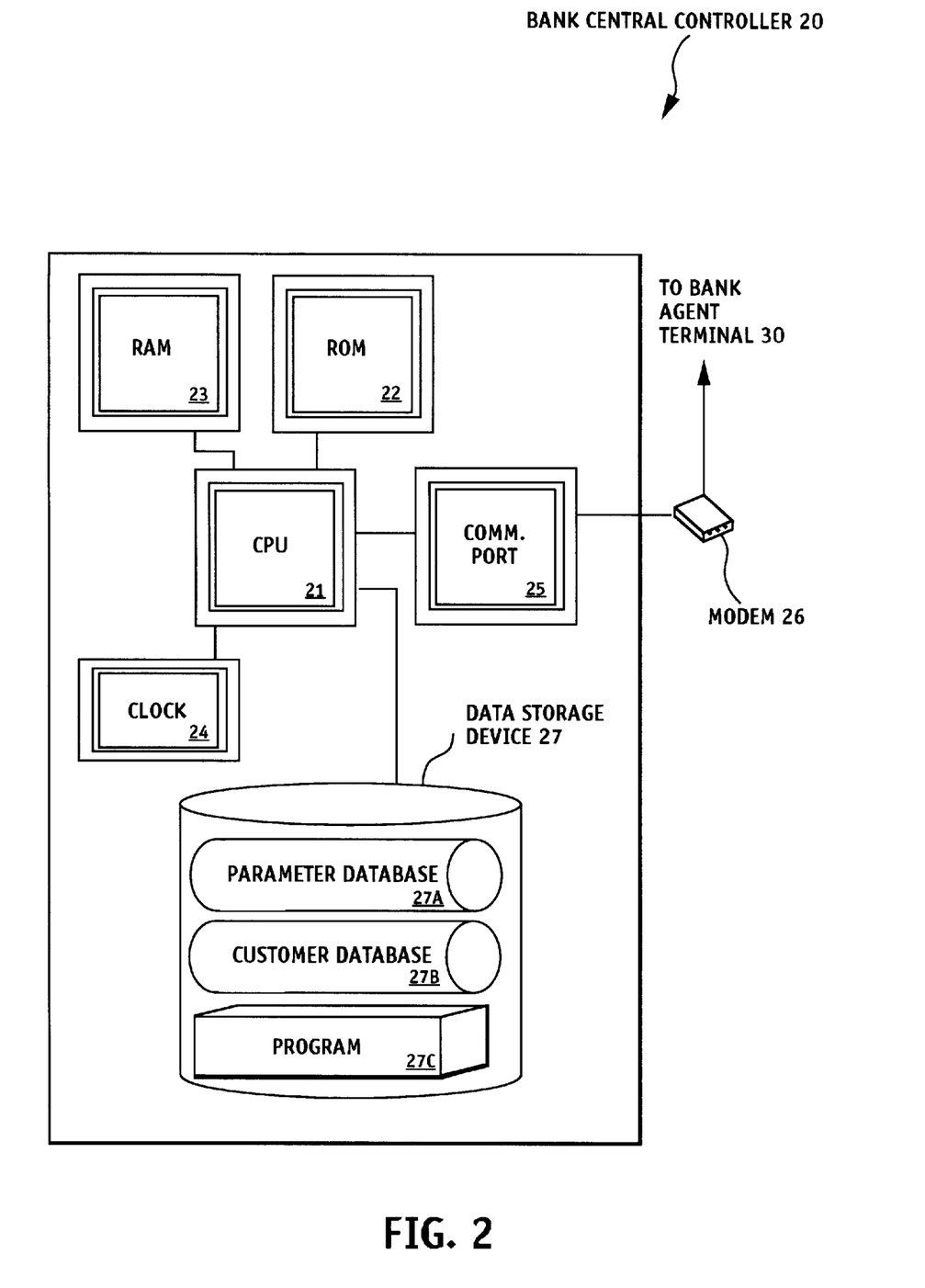
FIG. 2 is a block diagram of the central controller of FIG. 1.
Figure 3:
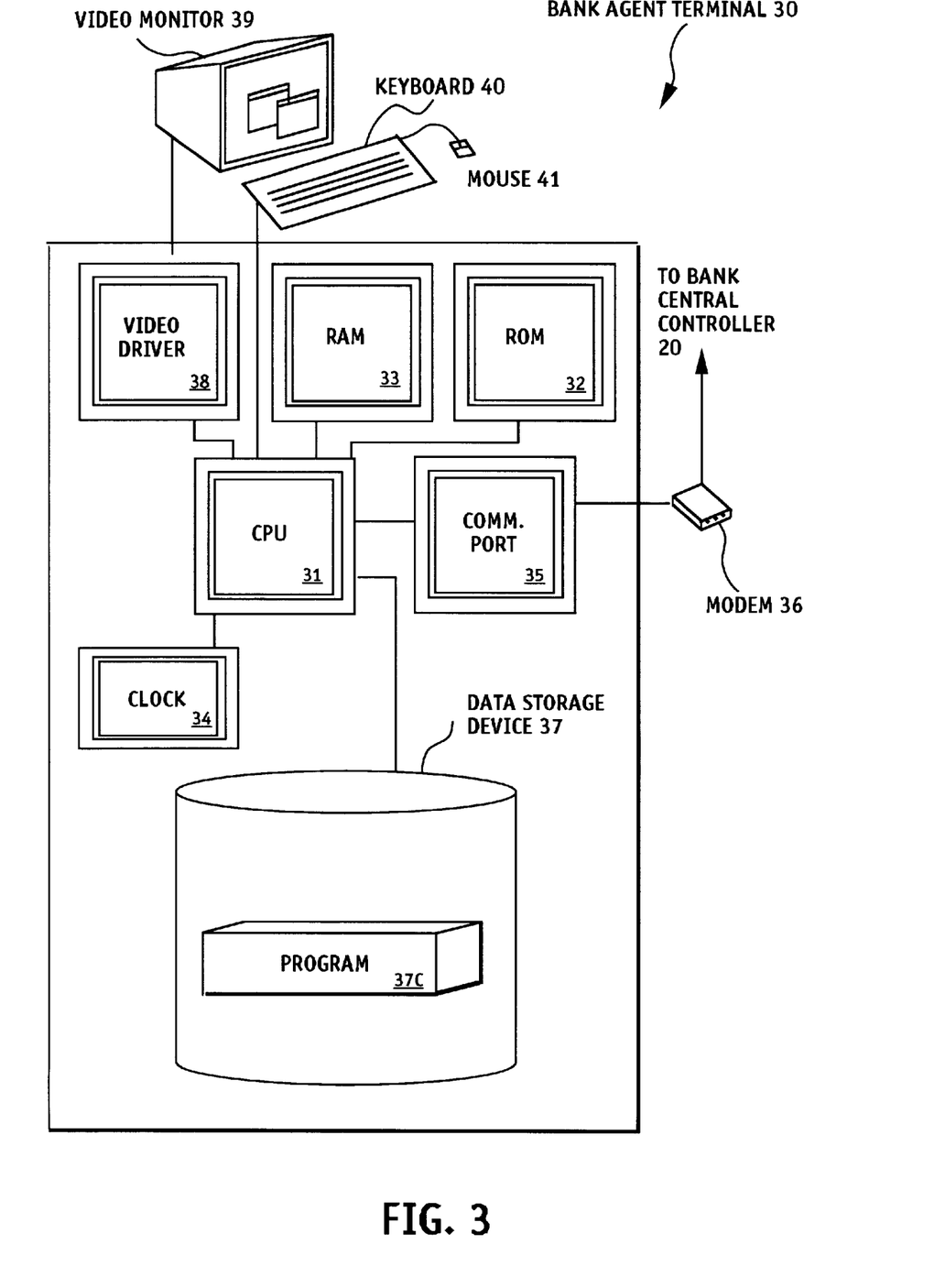
FIG. 3 is a block diagram of the agent terminal of FIG. 1.

Alternatively, although not so depicted in FIGS. 2 and 3, a stand-alone system can be implemented in a single location by combining the functions of the agent terminal and the central controller, and eliminating the communication links and redundant hardware.

FIG. 2 is a block diagram of a preferred central controller 20. The central controller includes a CPU 21 that performs the processing functions of the controller. It also includes a read only memory 22 (ROM) and a random access memory 23 (RAM). The ROM 22 is used to store at least some of the program instructions that are to be executed by the CPU 21, such as portions of the operating system or BIOS, and the RAM 23 is used for temporary storage of data. A clock circuit 24 provides a clock signal, which is required by the CPU 21. The use of a CPU in conjunction with ROM, RAM, and a clock circuit is well known to those skilled in the art of CPU-based electronic circuit design.

The central controller 20 also includes a communication port 25 which enables the CPU 21 to communicate with devices external to the central controller 20. In particular, the communication port 25 facilitates communication between the modem 26 and the CPU 21, so that information arriving from the modem 26 can be processed by the CPU 21, and the CPU 21 can send information to remote locations via the modem 26.

While the illustrated embodiment uses a modem 26 to communicate with devices outside the central controller 20, it should be understood that other methods of communicating with external devices may be used instead of a modem. These other methods include hard-wired connections, radio communications, optical communications, and the like.

CPU 21 can also store information to, and read information from, a data storage device 27. This data storage device 27 includes a parameter database 27a and a customer database 27b, which are described below. In addition, it includes a program 27c, which can be read and executed by the CPU 21, thereby controlling the operation of the central controller 20. While FIG. 2 depicts separate parameter and customer databases, a single database that incorporates both of those sets of data can also be used.

FIG. 3 is a block diagram of a preferred agent terminal 30, which can be located at a bank branch or office, by way of example. As discussed above, there can be any number of agent terminals 30 linked up to one central controller 20. Like the central controller 20 described above, the agent terminal 30 includes a CPU 31, ROM 32, RAM 33, and a clock circuit 34. The agent terminal 30 also includes a communication port 35 which interfaces with a modem 36 that facilitates communication between the agent terminal 30 and the central controller 20. Of course, instead of the modem 36 depicted in FIG. 3, methods of communication can be used, as described above for the central controller 20. A standard computer, such as an IBM-compatible PC or an Apple Macintosh, running appropriate software, may be used as the agent terminal. Existing terminals, currently being used for other functions in banks, may also be used.

The agent terminal 30 also includes an input device in the form of a keyboard 40 and a mouse 41, connected to receive input from an operator. Any of a wide variety of alternative input devices would also be suitable for this purpose (including, for example, touchscreens, digitizing tablets, trackballs, and the like). The input device may interface directly with the CPU 31, as shown in FIG. 3. Alternatively, an appropriate interface circuit may be placed between the CPU 31 and the input device.

The agent terminal 30 also includes a video monitor 39 for conveying information to the operator. While the preferred video monitor 39 is a CRT, other video display devices, including LCD, LED, and thin film transistor panels, may be used as well. Individual indicators may also be used to convey information to the operator, including incandescent and neon lamps, LEDs, and the like. A video driver 38 interfaces the CPU 31 to the video monitor 39 (or to any other type of video display device).

The agent terminal 30 also includes a data storage device 37, in which a program 37c is stored. This program includes instructions that can be read by and executed by the CPU 31, thereby controlling the operation of the agent terminal 30.

Figure 6:
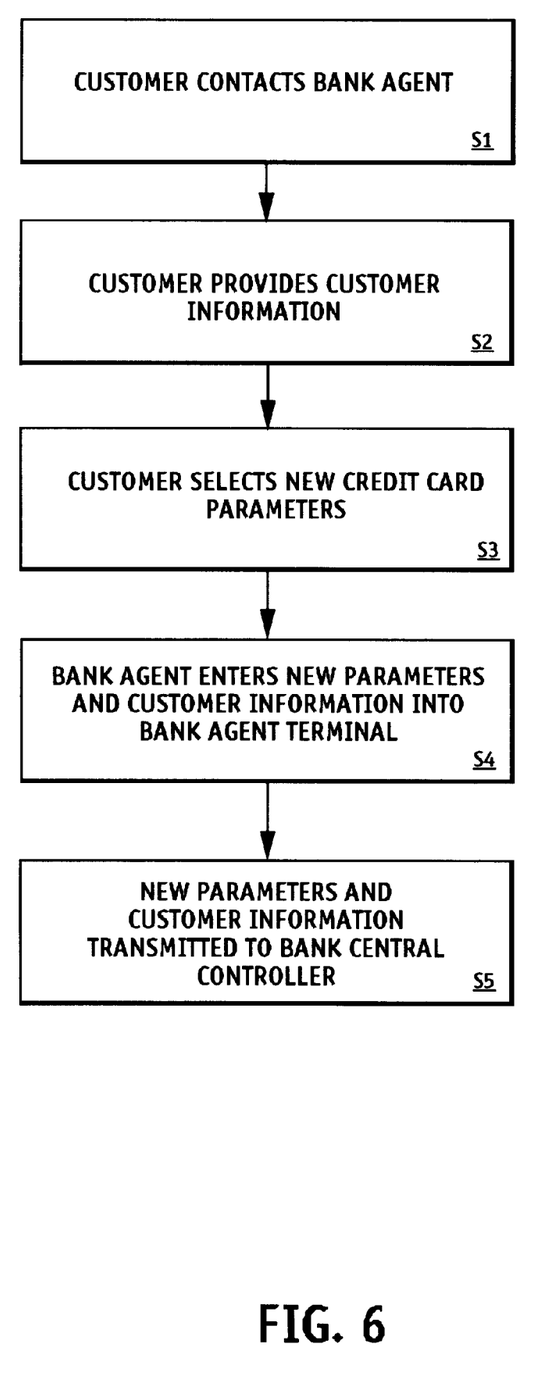
FIG. 6 is a flow chart depicting initiation of account customization in the agent terminal.

FIG. 6 depicts the initiation of a transaction at an agent terminal. The steps of the process of FIG. 6 are performed at an agent terminal 30 (which, along with other hardware described below, is depicted in FIG. 3). These steps may be implemented in a computer program that may be installed at the agent terminal 30 from, for example, a computer readable medium (such as a floppy disk or CD-ROM) and then stored in the data storage device 37 (such as a hard disk drive). After being installed, the program 37c can run from the data storage device 37. Alternatively, the program 37c can run directly from the computer readable medium. As yet another alternative, not shown in the figures, the computer program may be installed at the central controller 20 from a computer readable medium and then stored therein in one or more of ROM memory 22, RAM memory 23 and the data storage device 27, for access and use by the agent terminals as required.

The process starts when a customer contacts a bank agent in step S1. The customer provides customer information in step S2. Preferably, this customer information includes an account identifier that uniquely specifies a particular credit card account. The customer selects the new credit card parameters that he wants to have in step S3. These parameters include, for example, the interest rate, credit limit and monthly minimum payment. This information is entered by the bank agent into the agent terminal 30 in step S4. The credit card parameters and the customer information are then transmitted to the central controller 20 in step S5. Alternatively, the information can be entered by the customer directly into a suitable terminal.

Each of the steps S1–S5 described above is executed by the CPU 31, which executes a program 37c stored in the data storage device 37. The communication with the central controller 20 takes place via the communication port 35 and the modem 36.

Figure 4:
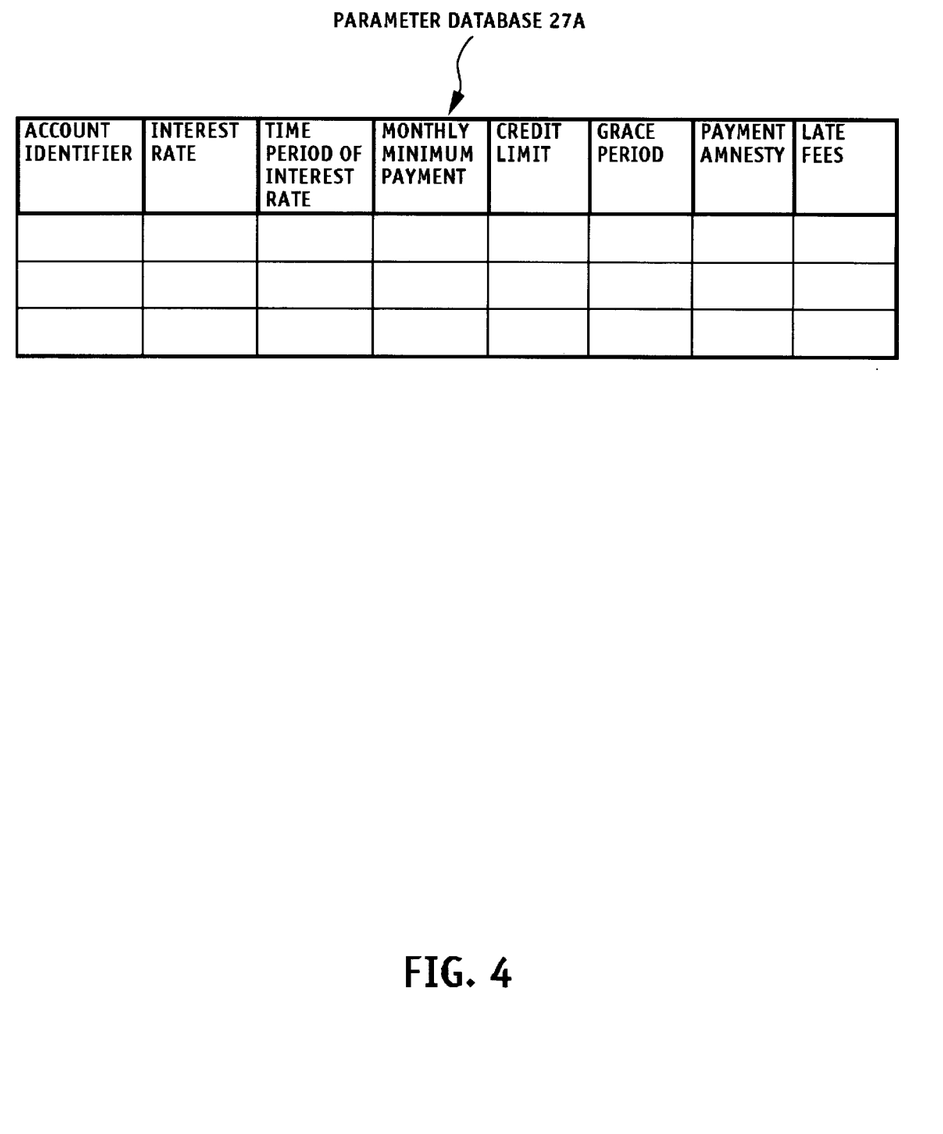
FIG. 4 is a table depicting a preferred set of fields for the parameter database of FIG. 2.

FIG. 4 depicts a preferred set of parameters pertaining to each credit account. These parameters are stored in the parameter database 27a. When the customer selects the parameters in step S3 of FIG. 6, he selects from the available parameters. The preferred parameters include: the interest rate that is charged on unpaid balances; the time period of the interest rate, which is the amount of time for which the interest rate must remain fixed; the monthly minimum payment, which will typically be a percentage of the outstanding balance; the credit limit, which is the maximum amount of credit that the issuer will extend to the card holder; the grace period, which is a period following a purchase during which interest does not accrue; payment amnesty, which records the number of times a customer is permitted to skip a monthly payment which is inconvenient to pay; and a late fee, which is a fee that is charged when a customer does not pay his bill on time.

Parameter database 27a is preferably indexed by the account identifier, linking parameter database 27a with customer database 27b. Of course, the invention is not limited to the parameters described above, and alternative parameters may be used.

Figure 7:
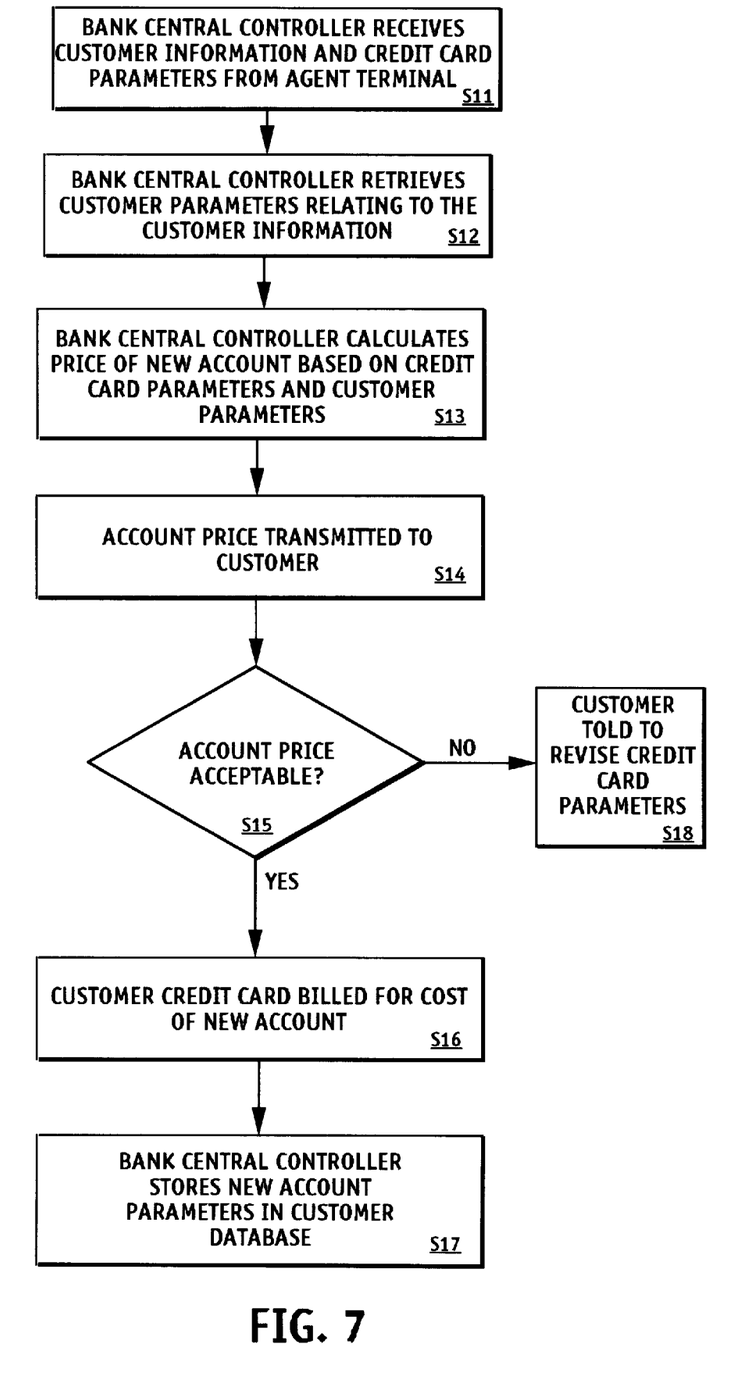
FIG. 7 is a flow chart depicting the operation of the central controller.

FIG. 7. is a flowchart of the operation of the central controller 20 (which, along with other hardware described below, is depicted in FIG. 2). The steps of the process shown in FIG. 7 may be implemented in a computer program 27c that may be installed at the central controller 20 from a computer readable medium and then stored therein in the data storage device 27. Alternatively, the program 27c may be installed in the ROM 22 or the RAM 23.

First, in step S11, the central controller 20 receives the credit card parameters and customer parameters that were transmitted from the agent terminal 30. The central controller 20 retrieves the customer parameters corresponding to the received customer information (which is preferably an account identifier) in step S12. These retrieved customer parameters are preferably stored in the customer database 27b.

Figure 5:
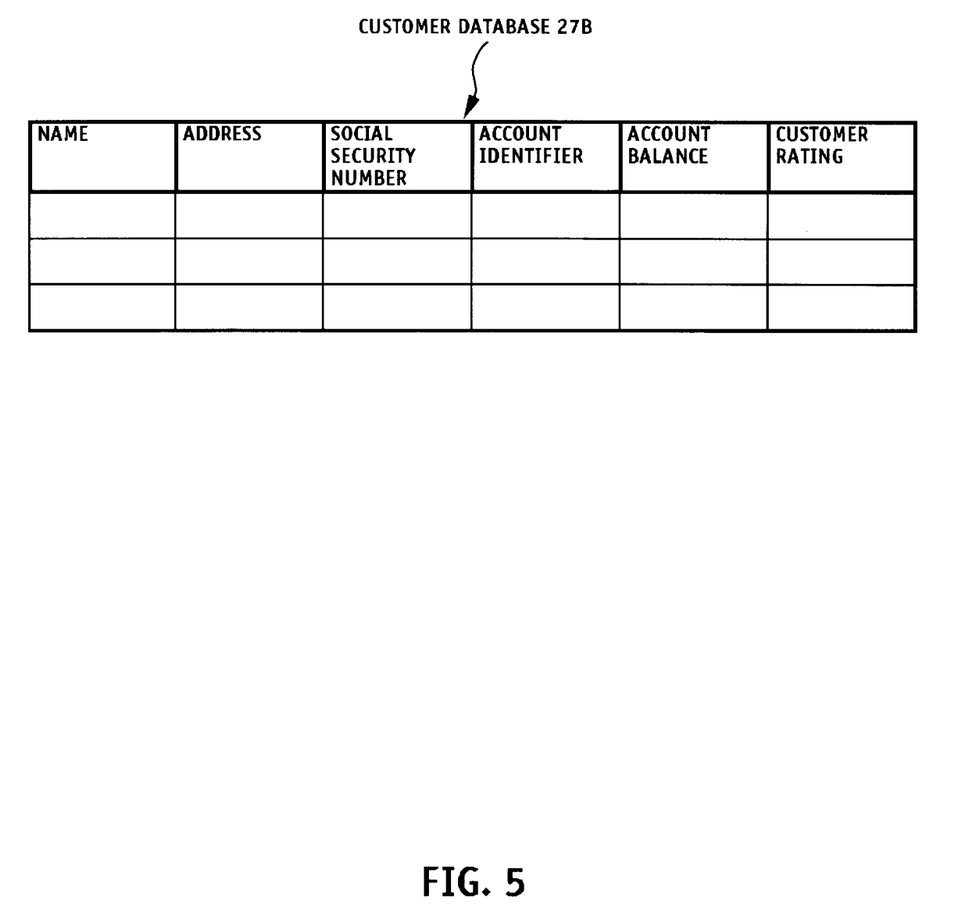
FIG. 5 is a table depicting a preferred set of fields for the customer database of FIG. 2.

A preferred set of customer parameters for existing customers is depicted in FIG. 5. These parameters are stored in customer database 27b. This set includes each customer's name and address; an account identifier (such as a credit card number); social security number (which is commonly used to identify individuals on their credit history records); the account balance (indicating the amount of money that the customer owes to the card issuer); and a customer rating. The customer rating rates the credit of the customer. This could be based on a customer's past payment history for the account in question. Alternatively, it could be based on information obtained from a credit reporting agency such as TRW or EQUIFAX. The credit rating could also be based on other factors such as the customer's income. A three-level customer rating of good, average, and bad may be established based on any of the above-mentioned factors, and then stored in the customer database 27b. Of course, the invention is not limited to the parameters described above, and alternative parameters may be used.

Returning now to FIG. 7, the central controller 20 then calculates the price of modifying the account in step S13 based on the credit card parameters received from the agent terminal along with the customer parameters from the customer database 27b. For example, a customer requesting a lower interest rate and lower minimum payments might be charged a fee of twenty dollars.

One example of calculating a price based on some of these parameters, and the effects of each of those parameters on the price, is described below.
(1) The Interest Rate:
Decreasing the interest rate on the card will result in less revenue for the card issuer, so the customer will have to pay a premium for lowering the interest rate. A base price due to the change in interest rate can be computed by multiplying the decrease in interest rate by the expected average monthly balance for the customer by the expected life of the customer.

For example, a customer who wants to lower his interest rate by 2%, and who carries an average balance of $500, and who has an expected customer life of 3 years, will result in the following base:

Base=2%×$500×3=$30

(2) The Time Period of the Interest Rate:

Interest rates which are fixed over a long period of time will result in greater exposure to adverse changes in market rates, therefore the price for changing parameters will increase as the length of the fixed period of coverage increases. The following multipliers for example may be used:

| | |
|---|---|
| 6 months | 110% |
| 1 yr | 120% |
| 2 yr | 130% |

(3) The Monthly Minimum Payments:

Smaller minimum payments will tend to increase the risk of default, which will raise the price. The following multipliers for example may be used:

| | |
|---|---|
| Payments lower by 30% | 120% |
| Payments stays the same | 100% |
| Payments increase by 30% | 80% |

(4) The Credit Limit:

Higher credit limits will tend to increase the risk of default, which will raise the price. The following multipliers for example may be used:

| | |
|---|---|
| Decrease limit by 50% | 60% |
| Decrease limit by 25% | 80% |
| Limit stays the same | 100% |
| Increase limit by 25% | 130% |
| Increase limit by 50% | 160% |

(5) The Grace Period:

Since the card issuer does not collect interest during the grace period, extending it will require an increase in the price. The following multipliers for example may be used:

| | |
|---|---|
| Stays the same | 100% |
| Extend by 2 weeks | 115% |
| Extend by 1 month | 125% |
| Extend by 2 months | 140% |

A sample calculation, using these parameters, will now be described for a hypothetical customer who wants to change the parameters of an existing account. This customer wants to lower the interest rate by 2%, lock the rate in for 1 year, increase his monthly payment by 30%, decrease his credit limit by 25%, and extend his grace period by 1 month.

Base=2%×$500×3=$30 (as calculated above)

Adjustment=120%×80%×80%×125%=96%

Price=Base×Adjustment=$30×96%=$28.80

Where no adjustment to the interest rate is requested, the base cost of the change will take a different form; for example a fixed-price processing fee, or a predetermined percentage of the average monthly payment or average monthly balance.

While the calculation described above uses a simple product of various parameters, numerous other formulae may be used to arrive at a suitable price.

The price calculated based on the credit parameters may also be modified by customer parameters, such as the customer rating from the customer database (shown in FIG. 5). For example, the price may be tripled for customers with a bad credit rating, doubled for customers with an average credit rating, and left unchanged for customers with a good credit rating.

Once the price information has been calculated, it is transmitted to the customer in step S14.

In some instances, the price of modifying the account may be zero. For example, if a customer wants to increase his minimum monthly payments by 30%, the credit card company may modify his account for free. A card issuer may even be willing to pay a customer to change the terms of his account when the new terms are more profitable for the issuer. Thus, the phrase "calculating the price", or equivalent phraseology used herein to describe an exchange of value for a change in credit terms, contemplates not only the computation of a price to be paid by the customer, but also circumstances in which the price or fee may be zero, or even where the credit issuer may provide a payment or credit to the customer for accepting new terms more favorable to the credit issuer.

After the price information is transmitted to the customer in step S14, the customer decides whether the price is acceptable in step S15. If he accepts the price for modifying his account, the system can process the sale by charging the customer's credit card, in step S16. This charging can be initiated by the central controller 20, (or by the agent terminal 30) using traditional credit card transaction procedures, such as those commonly used in retail stores. Transactions processed through the agent terminal 30 may be carried out using the same modem 36 that is used to communicate with the central controller 20. Alternatively, an additional modem (not shown) may be included in the agent terminal 30 to process the credit card transactions.

Of course, alternate methods of payment may be used instead of payment by credit card, including payment by cash, check, debit card, and the like. Alternatively, the bank may bill the customer for the price of modifying his account.

Finally, the customer database 27b is modified to reflect the new account parameters in step S17. If the customer decides that the account price is not acceptable during step S15, the customer is given a chance to revise the initially selected credit card parameters in step S18. By trading off the various parameters against each other, the customer may be able to find terms that are suitable. After the customer revises the credit card parameters, the new credit card parameters are processed by the system in the same way as the original credit card parameters to generate a new price.

The processes depicted in FIGS. 6 and 7 are described above in the context of customizing existing accounts. In this situation, the pre-existing parameters of the existing account may be used in the computation of the price for setting up an account having the new set of parameters.

A similar process may be performed, with appropriate modifications, when a new account is being opened. In particular, in FIG. 6, because there is no pre-existing account, a credit card number can not be used as the customer identifier. Accordingly, a customer identifier such as a social security number, a name and address, or the like may be substituted for the credit card number. Similarly, in FIG. 7, instead of retrieving customer parameters corresponding to the credit card number, the central controller may retrieve credit history information from a credit bureau (such as TRW or EQUIFAX) using the customer identifier. Finally, because there are no pre-existing credit parameters, the price for opening a new account can not be based on those parameters. Accordingly, a set of standard parameters, which the card issuer would otherwise use for a standard account with no fees, may serve as the existing parameters.

There has thus been provided a method, apparatus, and program that enables banks to offer credit card accounts with terms that can be modified to meet each customer's needs. The invention will enable card issuers to distinguish their services and products from those of their competitors. The invention accommodates these ends in a manner that maintains the profitability of the account for the bank, while meeting the changing financial needs of the customer.

In practice, the present invention will not just create a more valuable product for the customer. It will also enable the bank to maintain customers who might otherwise be tempted to leave for other credit card programs, and to attract customers who might otherwise establish an account with another bank.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A data processing apparatus for pricing a credit account having at least one customer specified credit parameter, comprising:
    a central controller including a CPU and a memory operatively connected to said CPU; and
    at least one terminal, adapted for communicating with said central controller, for transmitting the credit parameter to said central controller;
    said memory in said central controller containing a program, adapted to be executed by said CPU, for calculating a price for a credit account having the credit parameter;
    wherein said central controller receives the credit parameter from said terminal and calculates the price for the account based upon the credit parameter.

2. The apparatus according to claim 1, wherein the terminal is further adapted to transmit customer information to said central controller, and said program in said memory calculates the price of the account having the credit parameter based upon the customer information.

3. The apparatus according to claim 2, wherein the customer information comprises an account identifier that specifies a pre-existing credit account.

4. The apparatus according to claim 1, wherein said program in said memory is adapted to receive a customer acceptance via said terminal to enter into a credit account having the credit parameter and charge the customer the calculated price by debiting the customer's credit account.

5. A method of pricing a credit account having at least one customer specified credit parameter using a central controller including a CPU and a memory operatively connected to said CPU and containing a program adapted to be executed by said CPU for calculating the price of an account, and a terminal adapted for communicating with said central controller, the method comprising the steps of:
    inputting the credit parameter to the central controller via the terminal;
    executing the program to calculate, based on the credit parameter, a price for a credit account having the credit parameter; and
    outputting the calculated price from the controller to the terminal.

6. The method according to claim 5, further comprising the step of inputting customer information to the controller via the terminal, and wherein the step of executing the program further comprises calculating the price based on the customer information.

7. The method according to claim 5, wherein the step of inputting the customer information further comprises inputting an account identifier that specifies a pre-existing credit account.

8. A data processing apparatus for pricing a credit account having at least one customer specified credit parameter, comprising:
    a CPU;
    a memory operatively connected to said CPU, said memory containing a program, adapted to be executed by said CPU, for receiving the credit parameter and calculating a price for a credit account having the credit parameter; and
    input/output apparatus, operatively connected to at least one of said memory and said CPU, for input of the credit parameter and for output of the price.

9. The apparatus according to claim 8, wherein said program in said memory is further adapted to receive customer information and calculate the price based upon the customer information.

10. The apparatus according to claim 9, wherein the customer information comprises an account identifier that specifies a pre-existing credit account.

11. The apparatus according to claim 9, wherein said program in said memory is adapted to retrieve customer parameters corresponding to the customer information.

12. The apparatus according to claim 9, wherein said program in said memory is adapted to retrieve credit history information for a person identified by the customer information and said program in said memory is further adapted to calculate the price based upon the credit history information.

13. The apparatus according to claim 8, wherein the program in said memory is adapted to receive a plurality of credit parameters comprising a desired credit limit, a desired interest rate, and a desired time period, and wherein said program is adapted to calculate the price based on the desired credit limit, the desired interest rate, and the desired time period.

14. The apparatus according to claim 8, wherein said program in said memory is adapted to receive a customer acceptance to enter into a credit account having the credit parameter and to charge the customer the calculated price by debiting the customer's credit account.

15. The apparatus according to claim 8, wherein the credit account is a credit card account with revolving credit terms.

16. A method of pricing a credit account having at least one customer specified credit parameter using a CPU and a memory operatively connected to said CPU and containing a program, adapted to be executed by said CPU, for calculating a price, the method comprising the steps of:
    receiving the credit parameter;
    executing the program in the CPU for calculating a price for a credit account having the credit parameter; and
    outputting the price.

17. The method according to claim 16, further comprising the step of receiving customer information, and wherein the executing step calculates the price based on the customer information.

18. A method of pricing a credit account having at least one customer specified credit parameter, the method comprising the steps of:
    receiving the credit parameter;

calculating a price for a credit account having the credit parameter; and outputting the price.

19. The method according to claim 18, further comprising the step of receiving customer information, and wherein the calculating step calculates the price based on the customer information.

20. The method according to claim 19, wherein the customer information comprises an account identifier that specifies a pre-existing credit account.

21. The method according to claim 19, further comprising the step of retrieving customer parameters corresponding to lo the customer information.

22. The method according to claim 19, further comprising the steps of retrieving a credit report for the person identified by the customer information and calculating the price based upon the credit report.

23. The method according to claim 18, wherein the receiving step comprises receiving a desired credit limit, a desired interest rate, and a desired time period, and the calculating step calculates the price based on the desired credit limit, the desired interest rate, and the desired time period.

24. The method according to claim 18, further comprising the steps of receiving a customer acceptance to enter into a credit account having the credit parameter and charging the customer the calculated price.

25. The method according to claim 18, wherein the credit account is a credit card account with revolving credit terms.

26. Computer executable process steps, stored on a computer readable medium, for pricing a credit account having at least one customer specified credit parameter, comprising:

a step to receive the credit parameter;

a step to calculate the price of a credit account having the credit parameter; and a step to output the price.

27. The computer executable process steps according to claim 26, further comprising a step to receive customer information.

28. The computer executable process steps according to claim 26, wherein the customer information comprises an account identifier that specifies a pre-existing credit account.

29. A method of obtaining a price of a credit account having at least one customer specified credit parameter, the method comprising the steps of:

communicating to a pricing entity an inquiry on a price for a credit account having the credit parameter; and receiving from the pricing entity a price quote for a credit account having the credit parameter.

30. The method according to claim 29, further comprising the step of agreeing to enter into a credit account having the credit parameter and to pay the quoted price.

31. The method according to claim 29, wherein said communicating step includes providing customer information.

32. A method of obtaining a price of a credit account having at least one customer specified credit parameter, the method comprising the steps of:

communicating to a pricing entity an inquiry on a price for a credit account having the credit parameter, said entity provided with a CPU and a memory operatively connected to said CPU, said memory containing a program, adapted to be executed by said CPU, for receiving the credit parameter and calculating a price for a credit account having the credit parameter based on the credit parameter; and receiving from the pricing entity a price quote for a credit account having the credit parameter.

33. A data processing apparatus for pricing a credit account having at least one customer specified credit parameter, comprising:

a terminal adapted to communicate with a central controller, wherein the central contains a CPU and a memory operatively connected to the CPU, the memory containing a program, adapted to be executed by the CPU, for receiving the credit parameter and calculating a price based on the credit parameter for a credit account having the credit parameter, wherein said terminal is adapted to transmit the credit parameter to the central controller, and further adapted to receive the price from the central controller.

34. The apparatus according to claim 33, wherein the terminal is further adapted to transmit customer information to the central controller, and wherein the central controller calculates the price of the account based upon the customer information and the credit parameter.

35. The apparatus according to claim 33, wherein said terminal is adapted to transmit a customer request to enter into the credit account having the credit parameter.

36. A data processing apparatus for pricing a credit account having at least one customer specified credit parameter, comprising:

a CPU;

a memory operatively connected to said CPU, said memory containing a program, adapted to be executed by said CPU, for receiving the customer specified credit parameter and an account identifier that specifies an existing credit account, for retrieving existing credit parameters including a credit balance for the existing credit account, and for calculating a price for converting the existing credit account by changing at least one of the existing credit parameters to match the customer specified credit parameter, wherein the price calculation is based on the customer specified credit parameter and the existing credit parameters; and input/output apparatus, operatively connected to at least one of said memory and said CPU, for input of the customer specified credit parameter and for output of the price.

37. The apparatus according to claim 36, wherein said program in said memory is further adapted for receiving an authorization to convert the account, for replacing, in a database, the at least one of the existing credit parameters with the customer specified credit parameter, and for adding the price to the credit balance.

38. The apparatus according to claim 36, wherein said program is adapted for receiving a desired credit limit, interest rate, minimum payment, and time period; and wherein said program is further adapted for calculating the price based on the desired credit limit, interest rate, minimum payment, and time period.

39. The apparatus according to claim 36, wherein said program is further adapted for calculating the price based on parameters, retrieved from a database, selected from the group including a customer credit history, a risk of default, a current market interest rate, and the existing credit balance.

40. The apparatus according to claim 36, wherein the credit account is a credit card account with revolving credit terms.

41. A method of pricing a credit account having at least one customer specified credit parameter, the method comprising the steps of:

receiving the customer specified credit parameter and an account identifier that specifies an existing credit account;

retrieving existing credit parameters including a credit balance for the existing credit account;

calculating a price for converting the existing credit account by changing at least one of the existing credit parameters to match the customer specified credit parameter, wherein the price calculation is based on the customer specified credit parameter and the existing credit parameters; and outputting the price.

42. The method according to claim 41, further comprising the steps of:

receiving an authorization to convert the account;

replacing the at least one of the existing credit parameters with the customer specified credit parameter; and adding the price to the credit balance.

43. The method according to claim 41, wherein the step of receiving the customer specified credit parameter comprises the steps of receiving a desired credit limit, interest rate, minimum payment, and time period, and wherein the step of calculating the price is further based on the desired credit limit, interest rate, minimum payment, and time period.

44. The method according to claim 41, wherein the step of calculating the price is further based on parameters selected from the group including a customer credit history, a risk of default, a current market interest rate, and the existing credit balance.

45. The method according to claim 41, wherein the credit account is a credit card account with revolving credit terms.

46. A method of obtaining new terms for a credit account comprising the steps of:

providing an account identifier that specifies an existing credit account having existing parameters including a credit balance;

providing at least one desired credit parameter; and receiving a price for converting the parameters of the existing credit account by changing at least one of the existing parameters to match the desired credit parameter.

47. The method according to claim 46, further comprising the steps of:

authorizing the conversion of the account; and authorizing the addition of the price to the credit balance.

48. The method according to claim 46, wherein the credit account is a credit card account with revolving credit terms.

* * * * *